United States Patent
Kuhara

(10) Patent No.: US 7,184,628 B2
(45) Date of Patent: Feb. 27, 2007

(54) METHOD OF MANUFACTURING AN OPTICAL MODULE WITH DIFFRACTION GRATING

(75) Inventor: Yoshiki Kuhara, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/437,325

(22) Filed: May 19, 2006

(65) Prior Publication Data

US 2006/0215961 A1    Sep. 28, 2006

Related U.S. Application Data

(62) Division of application No. 10/633,977, filed on Aug. 4, 2003, now abandoned.

(30) Foreign Application Priority Data

Sep. 25, 2002 (JP) .............................. 2002-279520

(51) Int. Cl.
*G02B 6/34* (2006.01)
*H05B 7/144* (2006.01)

(52) U.S. Cl. ............................. 385/37; 385/31; 385/88; 372/6; 372/92; 372/98; 372/102

(58) Field of Classification Search ................... 385/31, 385/37, 88; 372/6, 92, 98, 102
See application file for complete search history.

(56) References Cited

U.S. PATENT DOCUMENTS

| 5,764,836 A | * | 6/1998 | Roff ............................. 385/88 |
| 6,273,620 B1 | * | 8/2001 | Kato et al. ..................... 385/88 |
| 6,895,031 B2 | * | 5/2005 | Yamabayashi et al. ....... 372/92 |
| 6,975,812 B1 | | 12/2005 | Kuhara et al. ................. 398/21 |
| 2001/0019648 A1 | * | 9/2001 | Nobuhara .................... 385/84 |

FOREIGN PATENT DOCUMENTS

JP        2000353845        12/2000

* cited by examiner

*Primary Examiner*—Frank G. Font
*Assistant Examiner*—Derek L. Dupuis
(74) *Attorney, Agent, or Firm*—Fish & Richardson P.C.

(57) ABSTRACT

An optical module comprising a column-shaped mounting member having a through hole extending along the central axis thereof and having a mounting surface formed by incising a part of the mounting member so as to expose the interior surface of the through hole; and an optical fiber inserted in the through hole and secured in a configuration such that the optical fiber protrudes with a specified length onto the mounting surface. The structure, in which a Bragg diffraction grating is formed in such protruding part of the optical fiber on said mounting surface, can prevent the occurrence of a change in reflective characteristic of the Bragg diffraction grating.

6 Claims, 13 Drawing Sheets

METHOD OF MANUFACTURING AN OPTICAL MODULE WITH DIFFRACTION GRATING

CROSS REFERENCE TO RELATED APPLICATION(S)

This application is a divisional of U.S. Ser. No. 10/633,977, filed on Aug. 4, 2003 now abandoned, the disclosure of which is incorporated by reference herein.

BACKGROUND OF THE INVENTION

1. Field of the Invention

The present invention relates to optical modules.

2. Description of the Background Art

Since Bragg diffraction gratings can selectively reflect the light of specific wavelengths (hereinafter referred to as "Bragg wavelengths") that satisfy Bragg conditions, they have conventionally been employed as wavelength selective filters in optical communications systems, for example. Such a Bragg diffraction grating is formed by providing a periodic refractive index change at an end region of an optical fiber. The light of the Bragg wavelength determined by the periodic refractive index change is reflected. An optical fiber with such a Bragg diffraction grating formed therein has its one end installed and secured to a mounting member such as a ferrule (Refer for example to Japanese Patent Application Publication No. 2000-353845).

An optical fiber having a Bragg diffraction grating formed therein is firmly fixed to a mounting member such as a ferrule by applying an adhesive between the part of the optical fiber that is located within the ferrule and the interior walls of the ferrule. In such a case, when the optical fiber is secured to the ferrule, such securing causes stress directly on the optical fiber, particularly at the area where a Bragg diffraction grating has been formed, and such stress changes the reflective characteristic of the Bragg diffraction grating.

SUMMARY OF THE INVENTION

The present invention has been accomplished in light of the abovementioned problem, and it aims to offer optical modules capable of preventing such change in the reflective characteristic of a Bragg diffraction grating formed in an optical fiber.

An optical module of this invention comprises a column-shaped mounting member which has a through hole provided therein extending along the central axis thereof and which is partially incised so as to form a mounting surface such that the interior surface of the through hole is exposed, and an optical fiber which is inserted in the through hole and secured in a configuration such that the optical fiber protrudes with a specified length on the mounting surface and a Bragg diffraction grating is formed in such protruding part of the optical fiber.

As a result of such arrangement in which the optical fiber is inserted and secured in the through hole of the mounting member such that the optical fiber protrudes with a specified length toward the mounting surface, the Bragg diffraction grating can be formed in the protruding part of the optical fiber after the optical fiber is secured to the mounting member. Consequently, it is possible to prevent abovementioned change that may occur in the reflective characteristic of the Bragg diffraction grating formed in the optical fiber.

It is preferable that the optical module also include an optical semiconductor device installed on the mounting surface and optically connected to an end of the optical fiber. In this case, the structure in which the optical semiconductor device is mounted on the mounting surface of the mounting member allows the downsizing of the optical module.

It is also desirable that the optical semiconductor device be a semiconductor optical amplifier, as such structure allows a downsized optical transmission module to be realized.

Preferably, the optical semiconductor device is a photodiode. Such structure allows the downsizing of the optical receiver module.

Furthermore, it is desirable that the mounting surface include a first area and a second area, the first area having the Bragg diffraction grating region of the optical fiber and a semiconductor optical receiver device that is optically coupled to an optical device which is capable of reflecting incident light of a specific wavelength range while transmitting incident light of another specified wavelength range and which is provided between, and optically connected to, the Bragg diffraction grating region of the optical fiber and another region thereof inserted in the through hole, the second area having a light emitting semiconductor device which is arranged to face an end of the optical fiber so as to be optically coupled thereto. Such a structure contributes to realizing a small optical transceiver module.

Preferably, the mounting member is made of ceramic, which is a material thermally stable, excellent in electrical insulation, and applicable to precise manufacturing.

It is desirable that the ceramic material be either alumina or zirconia in terms of their high workability and availability.

It is preferable that the optical module also include a lead frame that can support the mounting member and can electrically be connected to an optical semiconductor device. With this structure, the lead frame allows the optical module to be installed on a substrate outside, facilitating the electrical connection between the optical semiconductor device and the substrate outside.

It is also desirable that a resin sealing body also be provided so as to envelop the optical semiconductor device as well as the protruding part of the optical fiber on the mounting surface. This allows the protruding part of the optical fiber and the optical semiconductor device on the mounting surface to be preserved in excellent condition, enabling the individual elements of the optical module to be well protected.

An optical module according to this invention comprises a column-shaped mounting member having a through hole formed therein and extending along the central axis thereof, the mounting member having been partially incised so as to form a mounting surface, exposing the interior surface of the through hole; and an optical fiber inserted in the through hole and fixed in an arrangement such that the optical fiber protrudes with a specified length on the mounting surface, and a Bragg diffraction grating being formed in the protruding part of the optical fiber after such fixing of the optical fiber.

In the optical module according to this invention, since the Bragg diffraction grating is formed in the protruding part of the optical fiber protruding toward the mounting surface after the optical fiber is fixed on the mounting member, it is possible to prevent the occurrence of a change in the reflective characteristic of the Bragg diffraction grating formed in the optical fiber.

The optical module of the present invention comprises a mounting member having a first section, in which a through hole is formed, extending along the central axis thereof, and a second section, in which a groove is formed in continuation with, and in the same direction as, the through hole; and an optical fiber inserted in the through hole and fixed in a configuration such that the optical fiber protrudes with a specified length into the groove, the protruding part of the optical fiber in the groove having a Bragg diffraction grating formed therein.

In the optical module according to this invention, since an optical fiber is inserted in the through hole formed in the first section of the mounting member and fixed in a configuration such that the optical fiber protrudes with a specified length into the groove formed in the second section of the mounting member, the Bragg diffraction grating can be formed in the optical fiber that protrudes in the groove. With this structure, it is possible to prevent the occurrence of a change in the reflective characteristic of the Bragg diffraction grating formed in the optical fiber.

The optical module of the present invention comprises a mounting member having a first section wherein a through hole is formed extending along the central axis thereof, and a second section wherein a groove is formed extending in continuation with, and in the same direction as, the through hole; and an optical fiber inserted in the through hole and secured in a configuration such that the optical fiber protrudes with a specified length into the groove, the protruding part of the optical fiber in the groove having a Bragg diffraction grating formed after such securing of the optical fiber.

In the optical module according to this invention, since the Bragg diffraction grating is formed in the protruding part of the optical fiber in the groove after the optical fiber is secured on the mounting member, it is possible to prevent the occurrence of a change in the reflective characteristic of the Bragg diffraction grating formed in the optical fiber.

According to the present invention, as described in detail heretofore, it is possible to offer an optical module in which the occurrence of a change in the reflective characteristic of a Bragg diffraction grating formed in an optical fiber can be prevented.

DETAILED DESCRIPTION OF THE INVENTION

Figure 1:
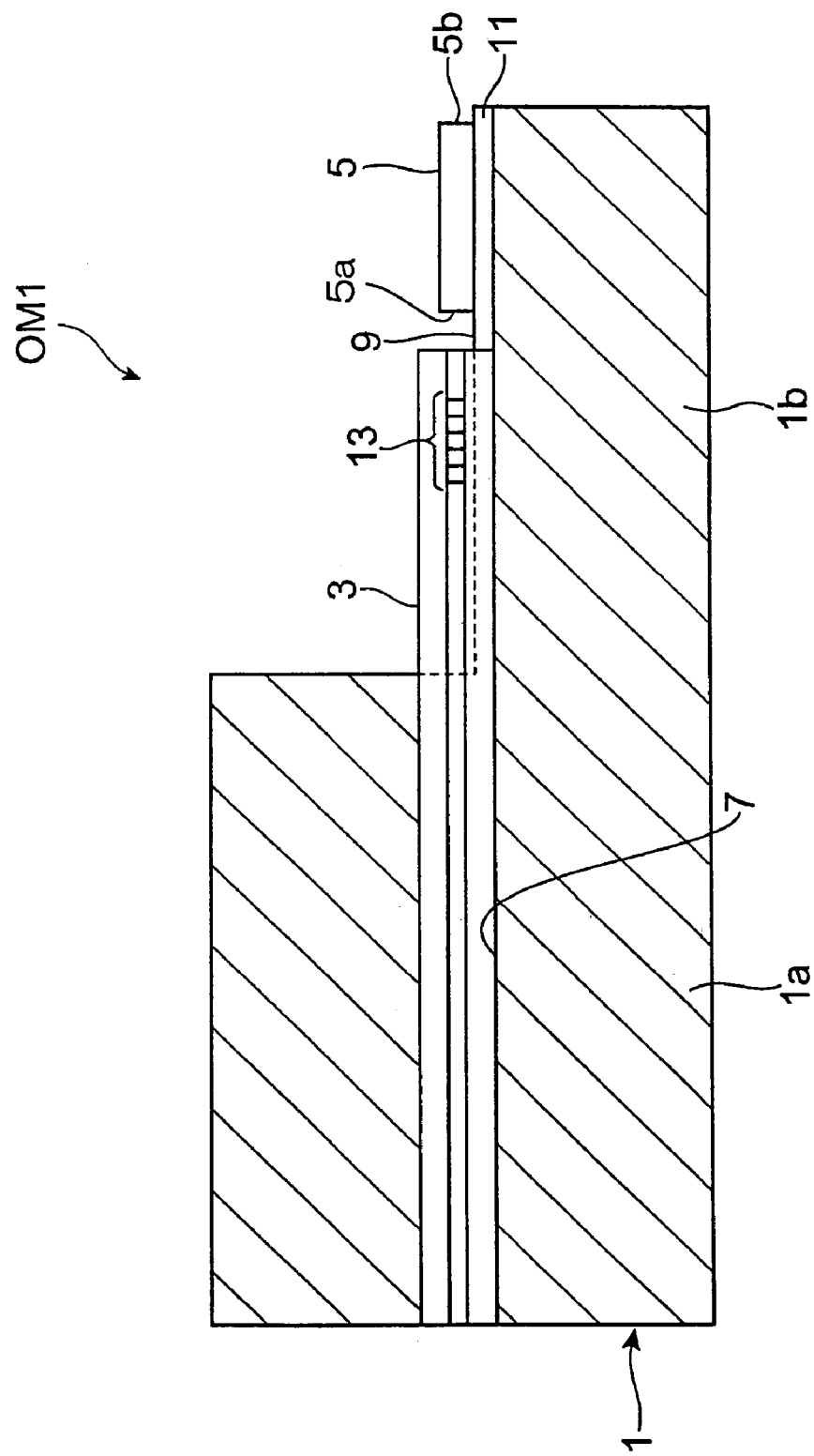
FIG. 1 is a sectional view of an optical transmission module according to a first embodiment of the present invention.

Preferred embodiments for carrying out the present invention are described hereinafter with reference to the accompanying drawings. In the drawings, the same components are denoted by the same reference numerals, and redundant descriptions thereof are omitted.

The First Embodiment

Figure 2:
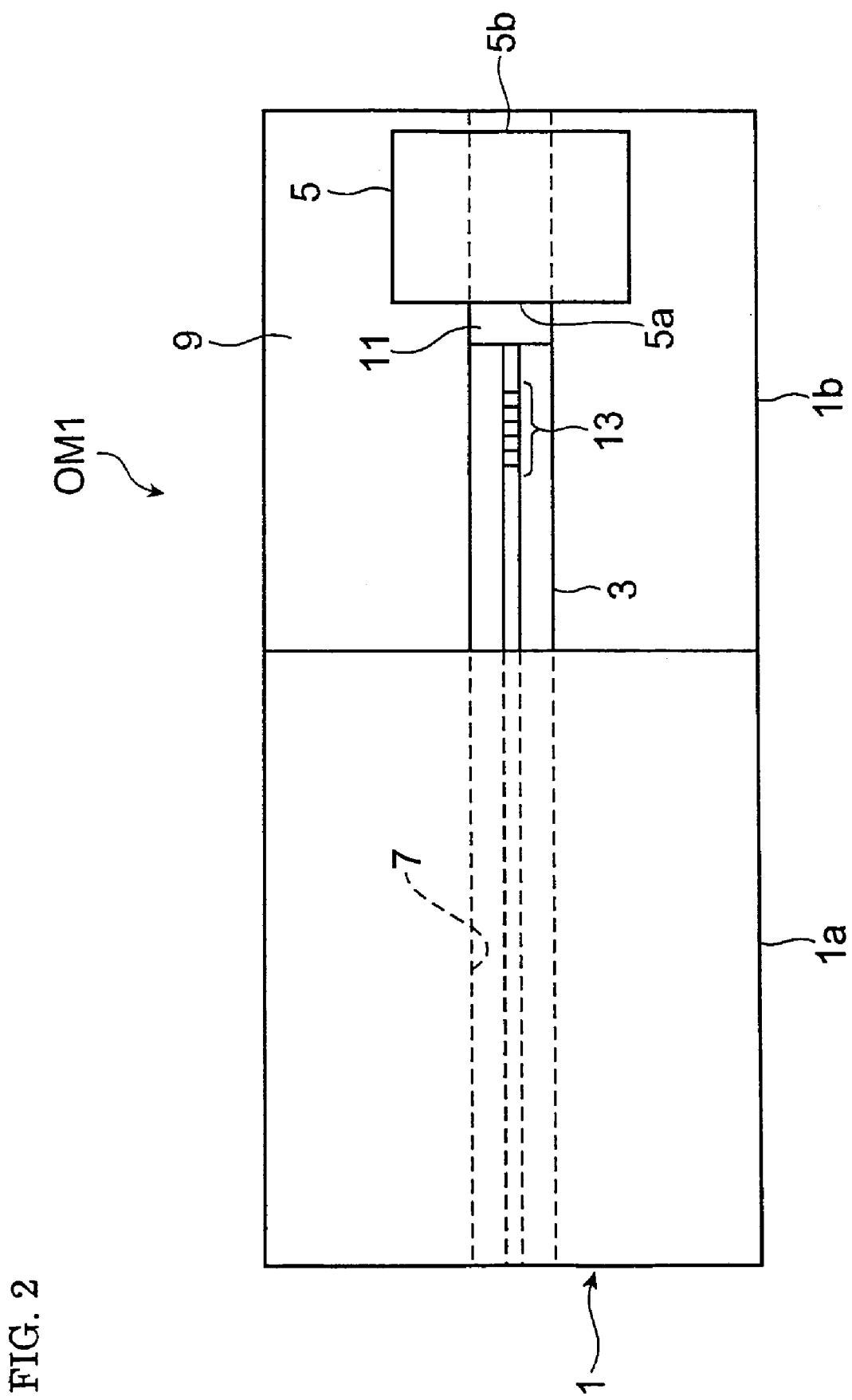
FIG. 2 is a plan view of the optical transmission module shown in FIG. 1.
Figure 3:
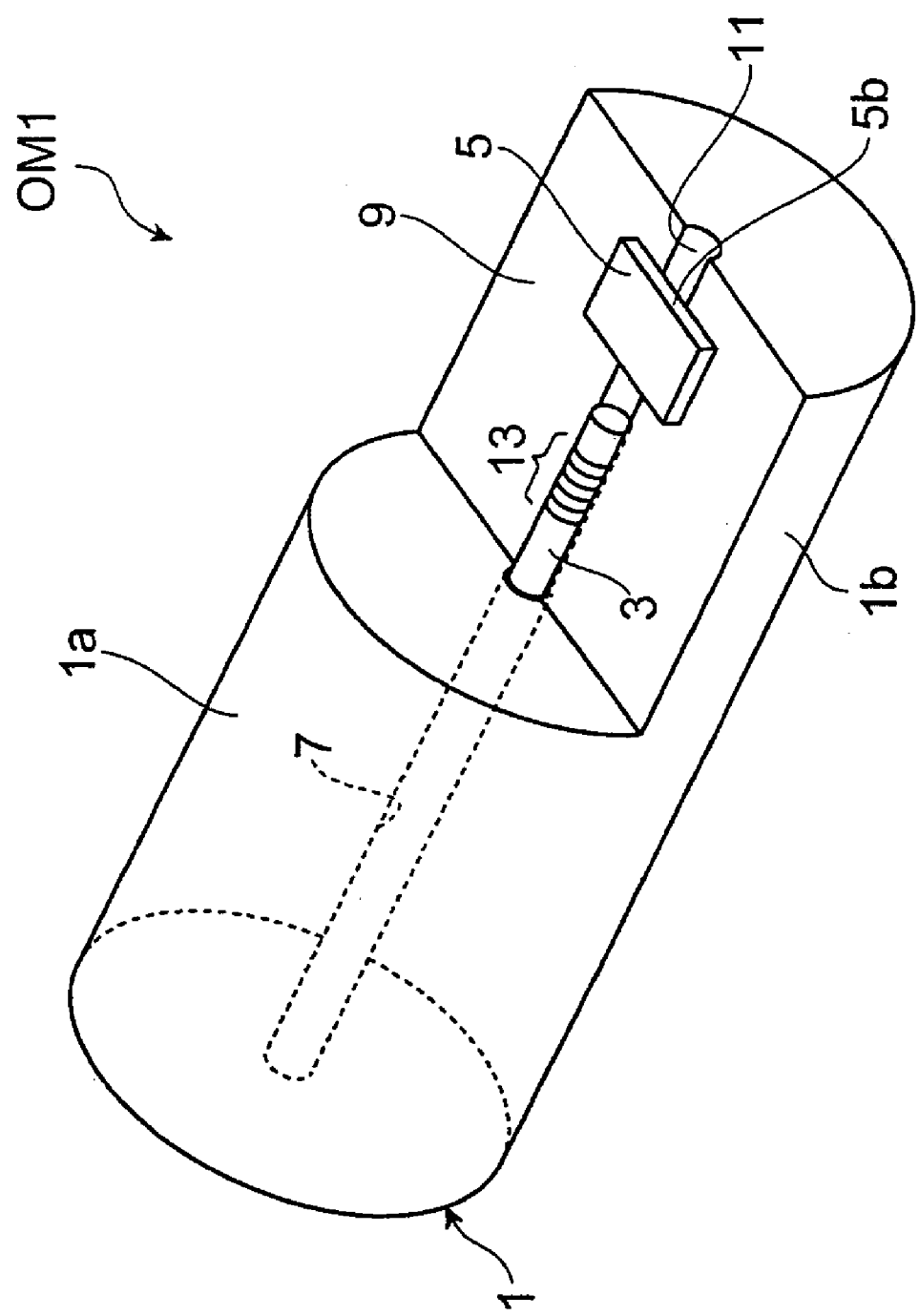
FIG. 3 is a perspective view of the exterior structure of the optical transmission module of FIG. 1.

In the first embodiment, the present invention has been applied to an optical transmission module capable of converting input electrical signals into optical signals for transmission. FIG. 1 is a sectional view of the optical transmission module according to the first embodiment, while FIG. 2 is a plan view thereof. FIG. 3 is a perspective view of the exterior structure of the optical transmission module shown in FIG. 1.

Referring to FIGS. 1 to 3, the optical transmission module OM1 includes a ferrule 1 as an embodiment of a mounting member, an optical fiber 3, a semiconductor optical amplifier 5 as an embodiment of an optical semiconductor device, and other parts.

The ferrule 1 is a column-shaped member (a cylindrical member in the first embodiment) made of ceramics (either alumina or zirconia for this embodiment) and has a through hole 7 extending along the central axis thereof. The through hole 7 is formed with an accuracy of approximately ±2 µm relative to the central axis of the ferrule 1. At one end of the ferrule 1, a mounting surface 9 is formed in parallel with the central axis of the ferrule 1. The mounting surface 9 can be formed in a method such as polishing or electric discharge machining. The mounting surface 9 is formed incising the through hole 7 at a specific distance from the central axis of the ferrule 1, for example, at a distance of approximately 10 µm with an accuracy of within about ±5 µm. As a result of these processing, the ferrule 1 have a first section 1a in which a through hole 7 is formed, and a second section 1b in which a groove 11 is formed extending in continuation with, and in the same direction as, the through hole 7.

For example, it is possible to design the ferrule 1 to have a diameter in the range of 1.25 mm to 2.50 mm and a length in the range of 5 mm to 15 mm along the central axis thereof. The through hole 7 can be designed to have a diameter of 126 µm±2 µm, and the mounting surface 9 can be designed to have a length in the range of 3 to 15 mm in the direction along the central axis thereof.

The optical fiber 3 is inserted in the through hole 7 of the ferrule 1 so as to protrude with a specified length (for example, from 2 to 5 mm) toward the mounting surface, and fixed with an adhesive or by other means to the ferrule 1. In other words, the optical fiber 3 is inserted in and secured to the through hole 7 in a configuration such that the optical fiber 3 protrudes with a specified length in the groove 11.

A Bragg diffraction grating 13 is provided in the optical fiber 3 at the exposed part thereof that protrudes onto the mounting surface 9, or in other words, into the groove 11. The Bragg diffraction grating 13 is formed after securing the optical fiber 3 to the ferrule 1. As further described herein later, the Bragg diffraction grating 13 composes an optical cavity, in combination with a light reflecting surface 5b of the semiconductor optical amplifier 5 in the optical transmission module OM1. In a typical case, the Bragg diffraction grating 13 can be designed to have a pitch of approximately 0.46 μm and a total length of 2 to 3.0 mm. With such a pitch, the reflection wavelength of the Bragg diffraction grating is, for example, in a wavelength band such as the 1310 nm band.

In a commonly employed method of producing the Bragg diffraction grating 13, germanium dioxide ($GeO_2$) is added in advance as a photosensitivity enhancement agent to the core or the clad of the silica ($SiO_2$) based optical fiber, and subsequently the optical fiber is irradiated by light of a specified wavelength, such as ultraviolet rays, so that a modulating pattern of the reflective index is formed corresponding to the distribution of the light energy intensity. Specifically, the specific modulation pattern of the reflective index is provided in at least either of the core or clad of the optical fiber by irradiating ultraviolet rays of a specified wavelength through a mask from a source such as a laser.

The semiconductor optical amplifier 5 is arranged on the mounting surface 9 of the ferrule 1 in a configuration such that the light emitting surface 5a of the semiconductor optical amplifier 5 faces an end of the optical fiber 3 so as to be optically coupled to the end of the optical fiber 3. The semiconductor optical amplifier 5 can be a semiconductor optical amplifier chip having a double hetero structure of InGsAsP and InP, for example. The semiconductor optical amplifier 5 can be installed on the mounting surface 9, for example, in a manner such that it is mounted on a metallized layer (a metallized pattern) formed on the mounting surface 9.

While one side of the semiconductor optical amplifier 5 constitutes a light emitting surface 5a, the other side thereof forms a light reflecting surface 5b. The light reflecting surface 5b has a coating thereon, whose reflective index ranges from 85 to 100%.

The optical transmission module OM1 functions as described hereinafter. When electric current containing specified signals is delivered to the semiconductor optical amplifier 5, light is released from the light emitting surface 5a thereof. The light passes through one end surface of the optical fiber 3, and enters into the optical fiber 3. Thereafter, laser oscillation occurs between the Bragg diffraction grating 13 and the light reflecting surface 5b of the semiconductor optical amplifier 5, thereby generating laser light. The laser light passes through the optical fiber 3 and is output from the other end thereof.

It is ideal to design a groove 11 formed on the mounting surface 9 of the ferrule 1 to have a depth such that the center of the light emitting part of the semiconductor optical amplifier 5 installed on and secured to the mounting surface 9 is positioned on the central axis of the through hole 7, that is, on the central axis of the optical fiber 3. By doing so, the light emitted from the semiconductor optical amplifier 5 can be effectively led into the optical fiber 3.

As described heretofore, the optical transmission module OM1 according to the first embodiment of the present invention has the optical fiber 3 inserted in the through hole 7 of the ferrule 1 and secured in a configuration such that the optical fiber 3 protrudes with a specified length toward the mounting surface 9 of the ferrule 1. With this structure, the Bragg diffraction grating 13 can be produced easily in such protruding part of the optical fiber 3 after the optical fiber 3 has been secured to the ferrule 1. Consequently, the occurrence of a change in the reflective characteristic of the Bragg diffraction grating 13 formed in the optical fiber 3 can be prevented.

The optical transmission module OM1 according to the first embodiment of the present invention includes the semiconductor optical amplifier 5 installed on the mounting surface 9 of the ferrule 1, allowing the downsizing of the optical transmission module OM1.

In the optical transmission module OM1 of the first embodiment, the ferrule 1 consists of a ceramic material, which is thermally stable, excellent in electric insulation and applicable to precise manufacturing. The ceramic material preferably is selected from either alumina or zirconia, as this will ensure excellent workability and availability.

Figure 4:
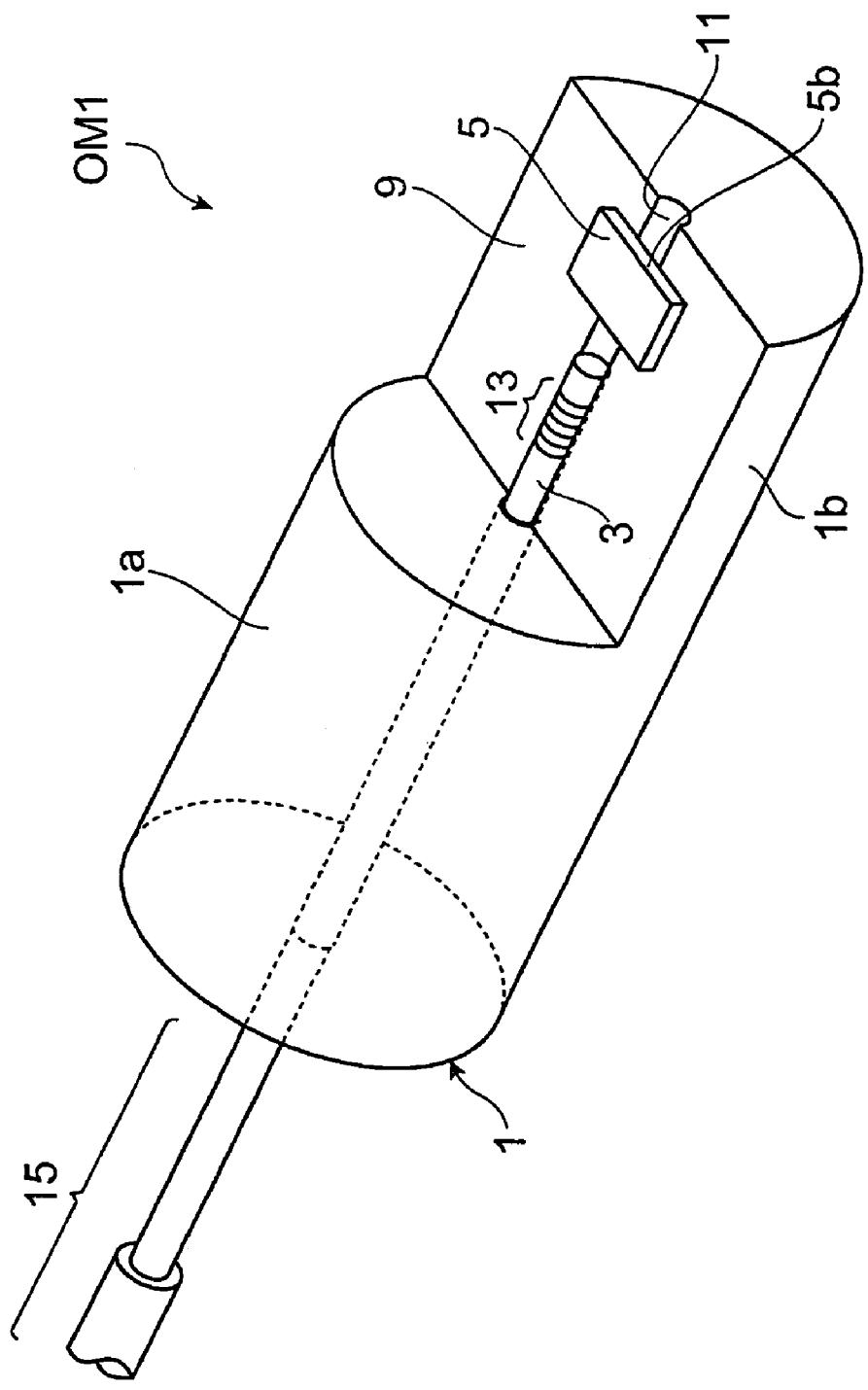
FIG. 4 is a perspective view of the exterior structure of a modification to the optical transmission module of the first embodiment of this invention.

In a modification to the first embodiment, as shown in FIG. 4, an optical fiber having a pig tail portion 15 can be employed as the optical fiber 3 of the optical transmission module OM1.

The Second Embodiment

Figure 5:
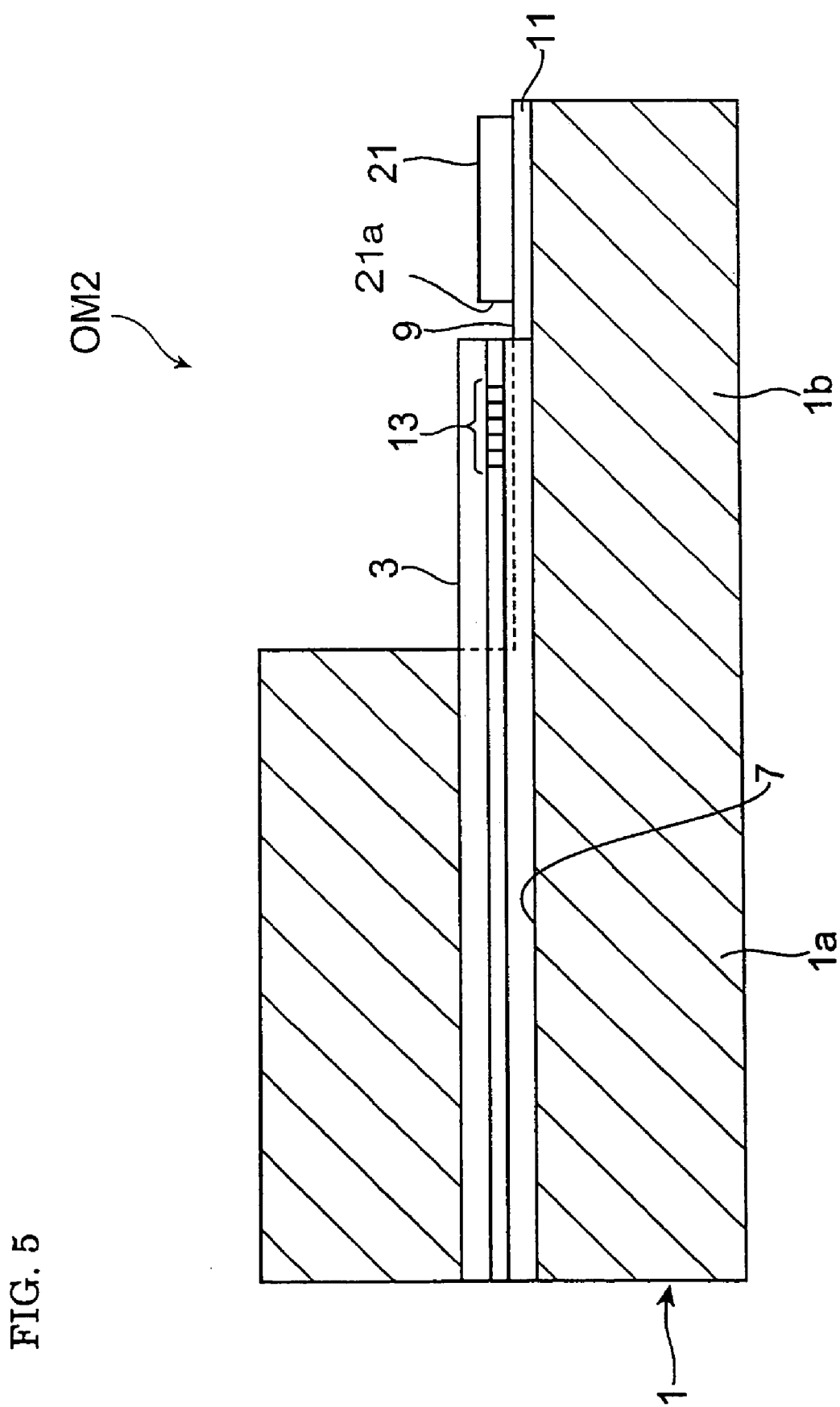
FIG. 5 is a sectional view of an optical receiver module according to a second embodiment of the present invention.
Figure 6:
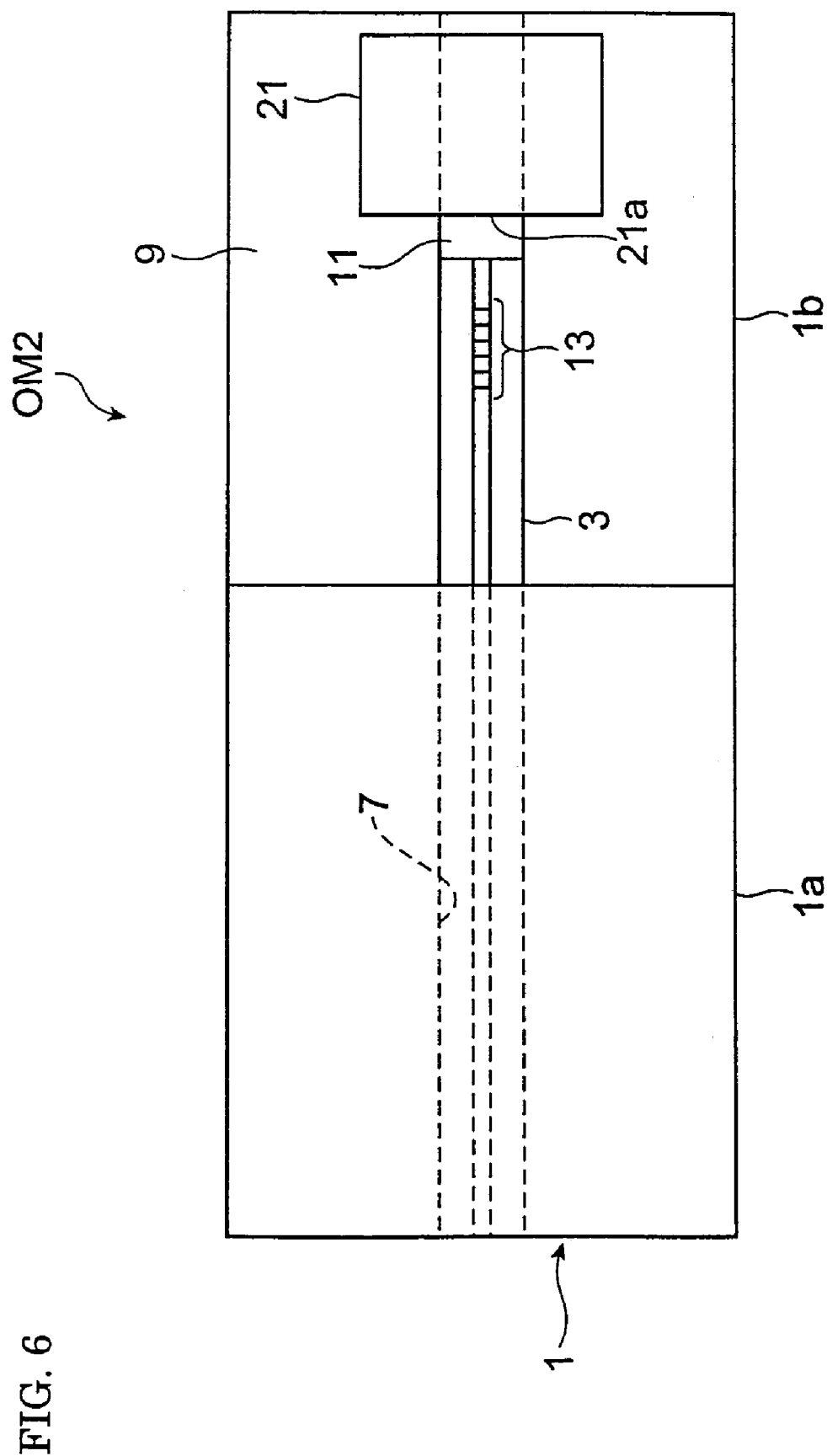
FIG. 6 is a plan view of the optical receiver module illustrated in FIG. 5.
Figure 7:
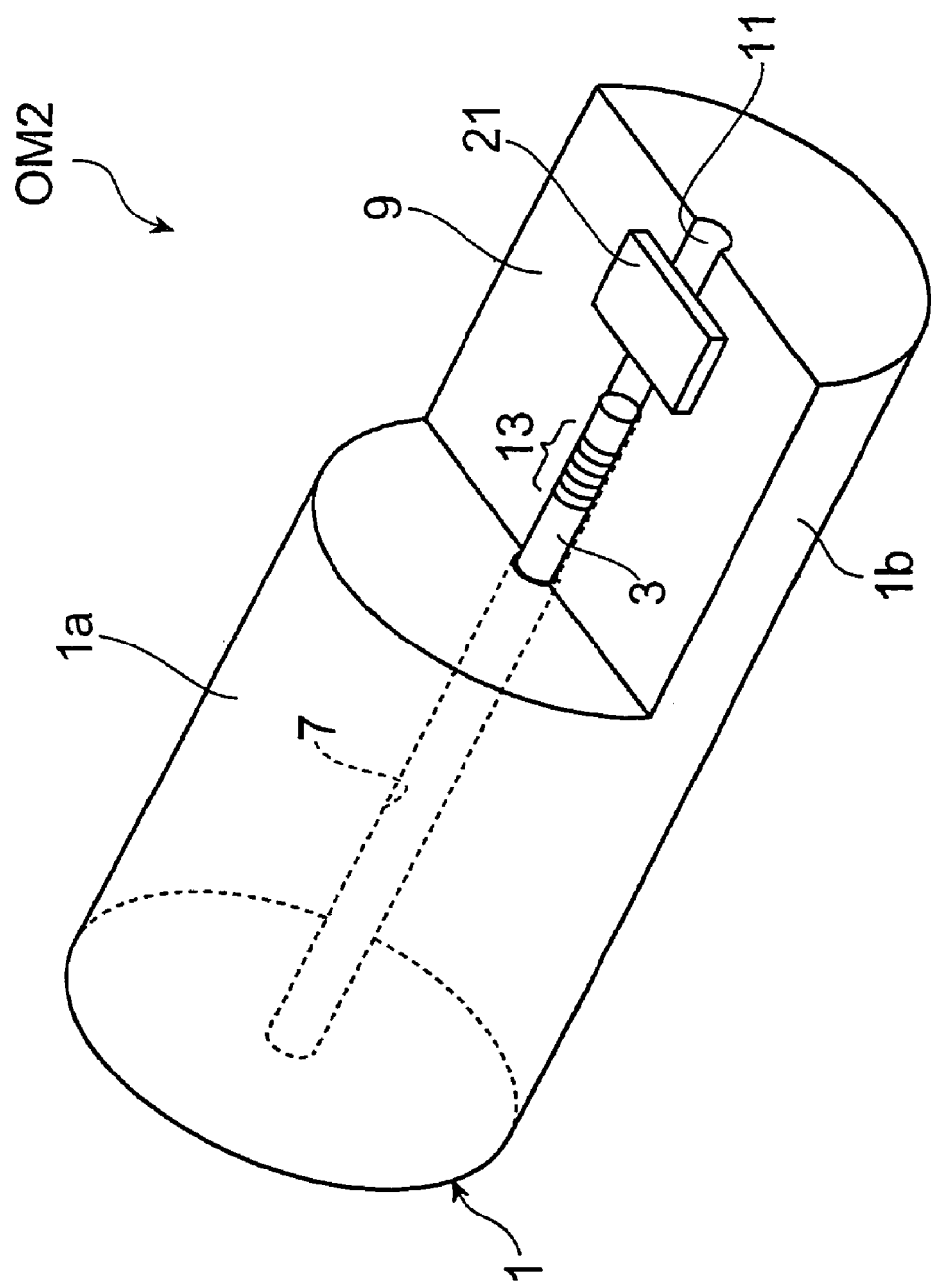
FIG. 7 is a perspective view of the exterior structure of the optical receiver module shown in FIG. 5.

In a second embodiment, the present invention has been applied to an optical receiver module that is capable of converting input optical signals to electrical signals for reception. FIG. 5 illustrates a cross section of the optical receiver module according to the second embodiment of the present invention. FIG. 6 is a plan view of the optical receiver module illustrated in FIG. 5. FIG. 7 shows a perspective view of the exterior structure of the optical receiver module OM2 of FIG. 5.

Referring to FIGS. 5 to 7, the optical receiver module OM2 includes a ferrule 1, an optical fiber 3, a photodiode 21 as an embodiment of optical semiconductor device, and other parts.

The photodiode 21 is placed on the mounting surface 9 of the ferrule 1 in a configuration such that the light incident surface 21a of the photodiode 21 faces an end of the optical fiber 3 so as to be optically coupled to the end of the optical fiber 3. An end-illuminated type photodiode containing InGaAsP for a light-receiving part can be employed as the photodiode 21, for example. The photodiode 21 can be installed on the mounting surface 9, for example, on a metallized layer formed thereon.

As described heretofore, also in the optical receiver module OM2 according to the second embodiment of the present invention, the optical fiber 3 is inserted in the through hole 7 of the ferrule 1 and secured in a configuration such that the optical fiber 3 protrudes with a specified length toward the mounting surface 9 of the ferrule 1. With this structure, the Bragg diffraction grating 13 can be produced easily in the protruding part of the optical fiber 3 on the mounting surface 9 after the optical fiber 3 has been secured to the ferrule 1. Consequently, it is possible to prevent the occurrence of a change in the reflective characteristic of the Bragg diffraction grating 13 formed in the optical fiber 3.

In the optical receiver module OM2 according to the second embodiment of the present invention, the photodiode 21 is installed on the mounting surface 9 of the ferrule 1. This configuration contributes to realizing the downsized optical receiver module OM2.

Figure 8:
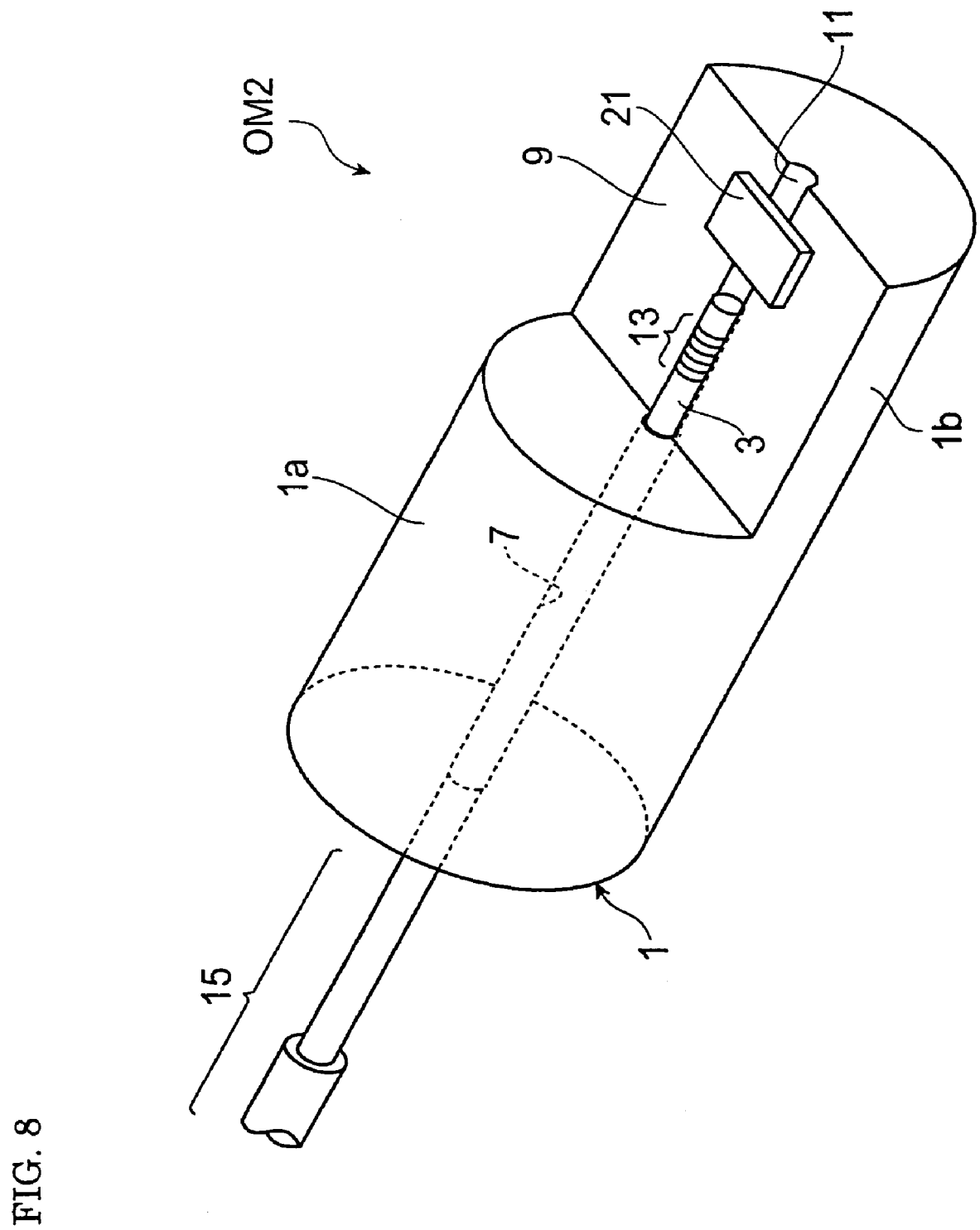
FIG. 8 is a perspective view of the exterior structure of a modification to the optical receiver module of the second embodiment of this invention.

In a modification to the second embodiment, as illustrated in FIG. 8, an optical fiber having a pig tail portion 15 can be employed as the optical fiber 3 of the optical receiver module OM2.

The Third Embodiment

Figure 9:
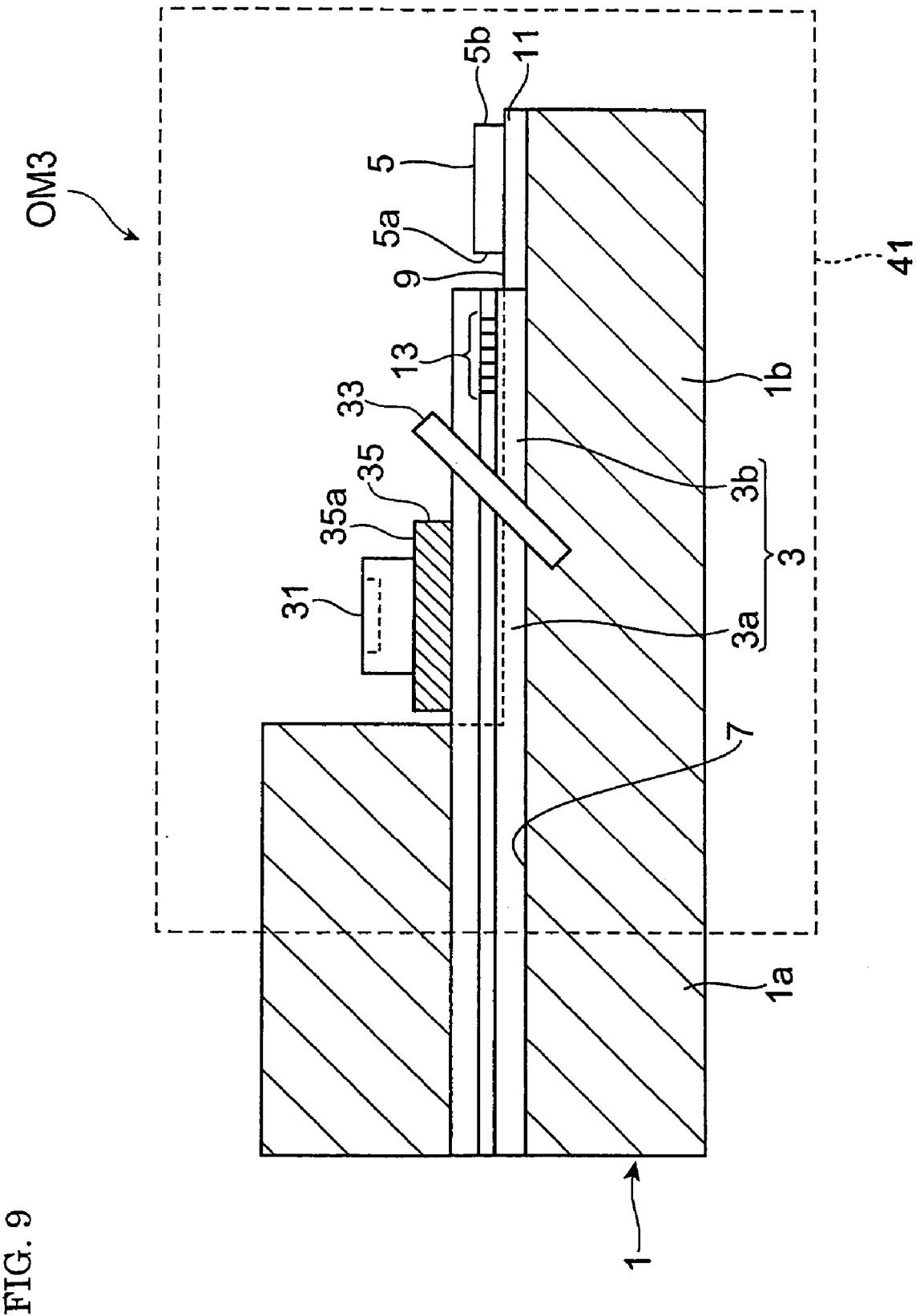
FIG. 9 is a sectional view of an optical transceiver module according to a third embodiment of the present invention.
Figure 10:
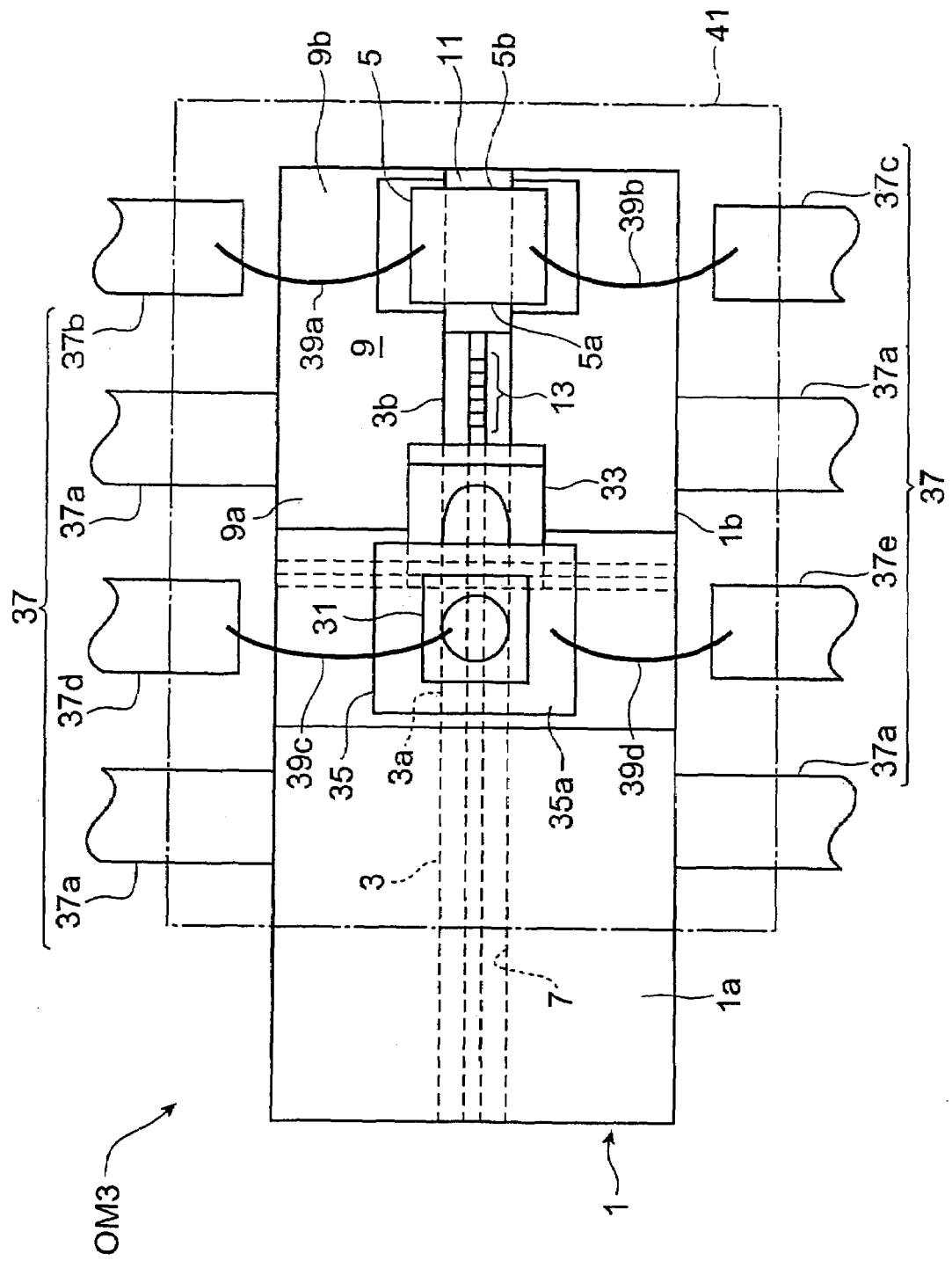
FIG. 10 is a plan view of the optical transceiver module illustrated in FIG. 9.
Figure 11:
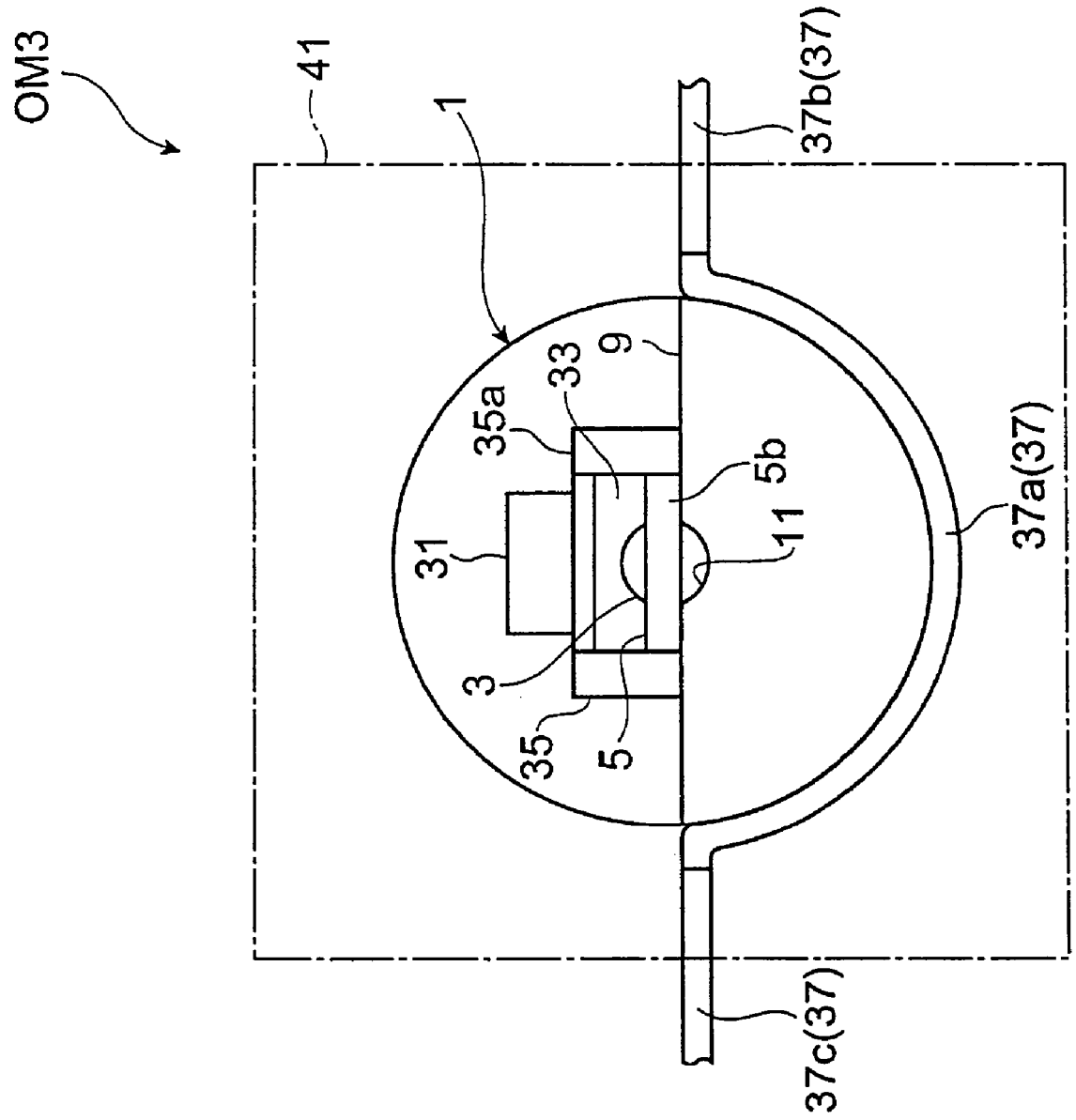
FIG. 11 is a front view of the optical transceiver module illustrated in FIG. 9.
Figure 12:
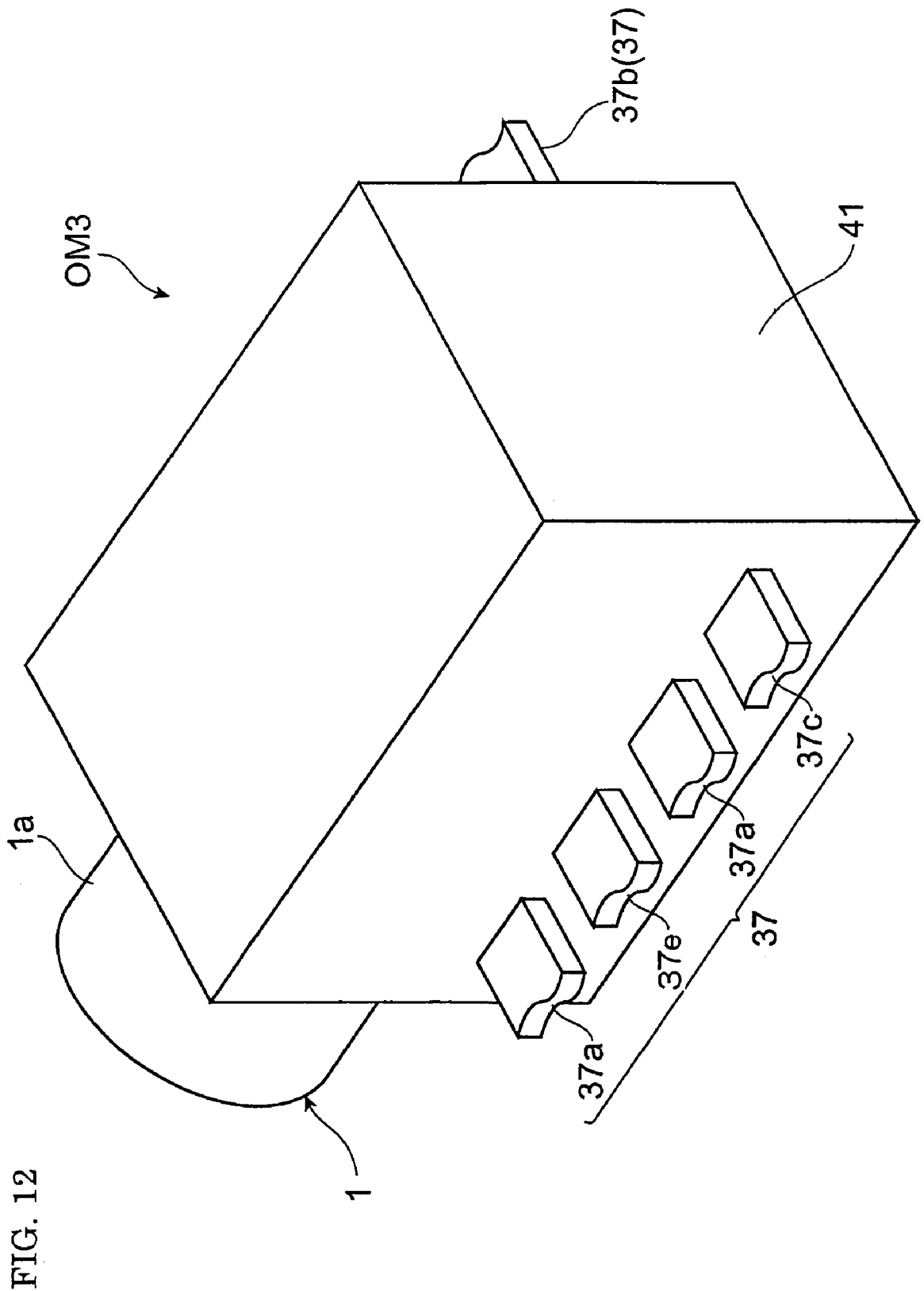
FIG. 12 is a perspective view of the exterior structure of the optical transceiver module shown in FIG. 9.
Figure 13:
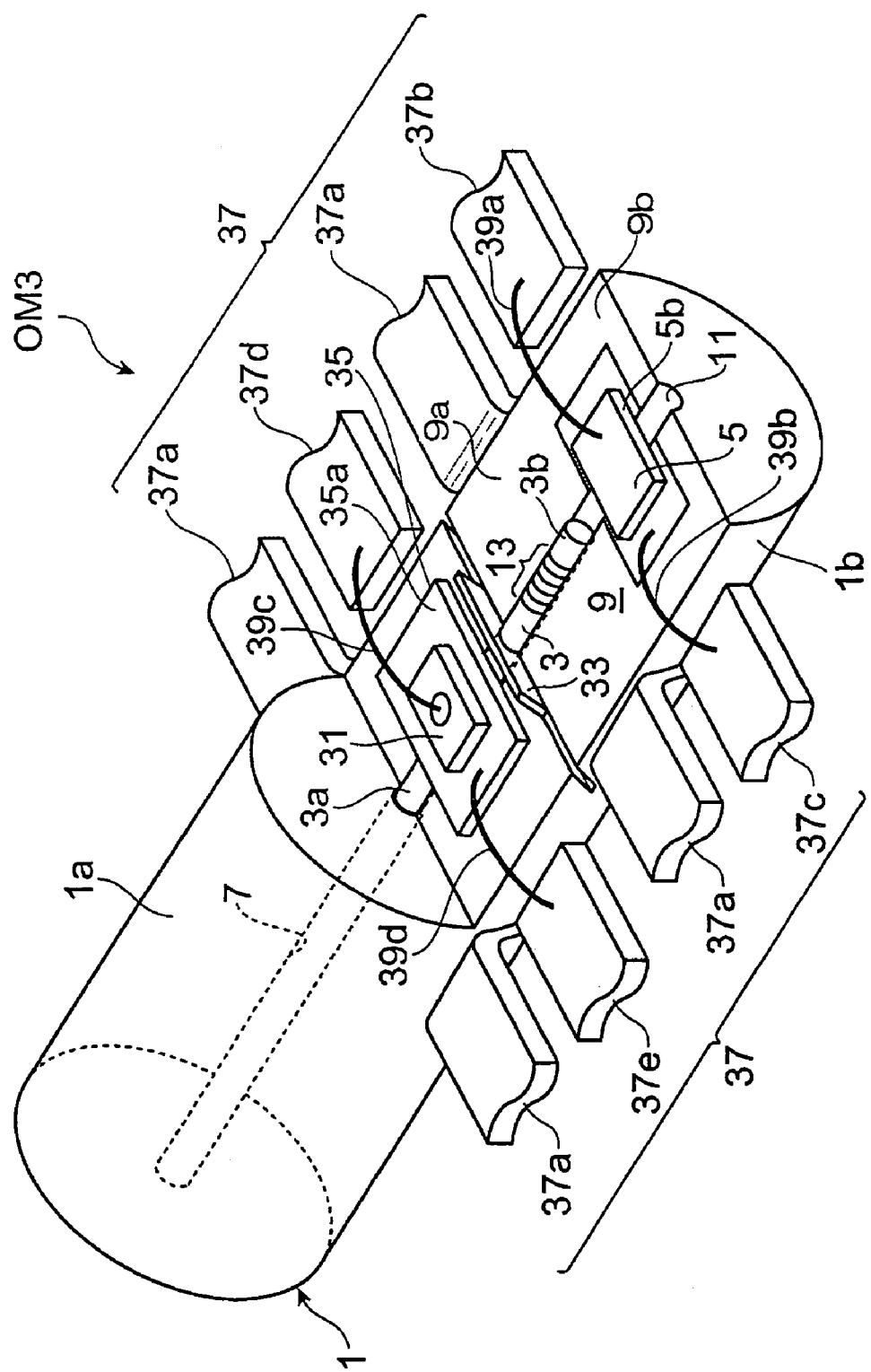
FIG. 13 is a perspective view of the exterior structure of the optical transceiver module of FIG. 9, when its resin sealing is excluded.

In a third embodiment, the present invention is applied to an optical transceiver module OM3 that is capable both of converting input electrical signals to optical signals for transmission and of changing input optical signals into electric signals for reception. FIG. 9 is a cross section view of the optical transceiver module OM3 according to the third embodiment, while FIG. 10 shows a plan view thereof. FIG. 11 is a front view of the optical transceiver module illustrated in FIG. 9 and FIG. 12 shows a perspective view of its exterior structure. FIG. 13 illustrates the optical transceiver module of FIG. 9 in a state where its resin sealing body is excluded.

Referring to FIGS. 9 to 12, the optical transceiver module OM3 includes a ferrule 1, an optical fiber 3, a semiconductor optical amplifier 5 as an embodiment of a semiconductor light emitting device, a photodiode 31 as an embodiment of a semiconductor optical receiver device, an optical device 33, and other parts.

The ferrule 1 has a mounting surface 9 consisting of a first area 9a and a second area 9b, both of which are arranged to extend in the same direction as a groove 11. The part where a Bragg diffraction grating 13 is formed in the optical fiber 3 lies in the first section 9a.

The semiconductor optical amplifier 5 is provided on the second area 9b of the mounting surface 9 of the ferrule 1 in a configuration such that the light emitting surface 5a of the semiconductor optical amplifier 5 faces an end of the optical fiber 3 so as to be optically coupled to the end of the optical fiber 3.

The optical device 33 is capable of reflecting the incident light of a first wavelength range (for example, a 1550 nm wavelength band) while transmitting the incident light of a second wavelength range (for example, a 1310 nm band). An optical filter incorporating a dielectric multilayer film can be employed as the optical device 33. The optical device 33 is placed between a part 3b of the optical fiber 3 in the first area 9a, in which part the Bragg diffraction grating 13 is formed and a part 3a of the optical fiber 3, which part is inserted in the through hole 7, and the optical device 33 is optically connected to both of the parts 3a and 3b. The optical device 33 forms an acute angle (for example, at approximately 30°) relative to the mounting surface 9 of the ferrule 1.

The optical device 33 is capable of transmitting the laser light of the second wavelength range that has been generated by laser oscillation between the Bragg diffraction grating 13 formed in the optical fiber 3 and the light reflecting surface 5b of the semiconductor optical amplifier 5. On the other hand, the optical device 33 can reflect such light of the first wavelength range that propagates through the optical fiber 3 in the opposite direction relative to the aforementioned laser light.

The photodiode 31 is provided in the first area 9a of the mounting surface 9 and optically connected to the optical device 33. A rear-illuminated type photodiode can be employed as the photodiode 31. The photodiode 31 is placed on a mounting member 35 and positioned above the optical fiber 3. In other words, the optical fiber 3 is positioned between the photodiode 31 and the ferrule 1. The mounting member 35 can be used as a fixing member to secure the optical fiber 3. The photodiode 31 receives the light of the first wavelength range that is incident via the optical fiber 3 (the part 3a inserted in the through hole 7), the optical device 33, and the mounting member 35.

The mounting member 35 can transmit the light of the first wavelength range therethrough and has the mounting surface 35a for placing the photodiode 31 thereon. The rear side of the mounting surface 35a functions as the basis for determining the location of the optical fiber 3. The photodiode 31 is provided in an arrangement such that the light incident surface thereof faces the mounting surface 35a.

The optical transceiver module OM3 also contains a lead frame 37. The lead frame 37 includes supporting parts 37a, which are in contact with the exterior surface of the ferrule 1 so as to support the ferrule 1; terminals 37b and 37c electrically connected to the semiconductor optical amplifier 5; and terminals 37d and 37e electrically connected to the photodiode 31.

The semiconductor optical amplifier 5 incorporates an anode and a cathode. The anode is connected to the terminal 37b via a connecting member 39a such as a bonding wire, and similarly the cathode is connected to the terminal 37c via a connecting member 39b such as a bonding wire. The photodiode 31 also includes an anode and a cathode. The anode is connected to the terminal 37d via a connecting member 39c such as a bonding wire, and similarly the cathode is connected to the terminal 37e via a connecting member 39d such as a bonding wire.

The optical transceiver module OM3 incorporates a resin sealing body 41 to envelop the protruding part of the optical fiber 3 on the mounting surface 9, the semiconductor optical amplifier 5, the photodiode 31, and the optical device 33. Along with the protection of the individual parts, this structure enables the protruding part of the optical fiber 3 on the mounting surface 9, the semiconductor optical amplifier 5, the photodiode 31, and the optical device 33 to be maintained in excellent conditions. It is preferable that the resin sealing body 41 be transparent such that the light of both the first and second wavelength ranges are transmittable in order to ensure the respective optical connections between the semiconductor optical amplifier 5 and the optical fiber 3, between the optical device 33 and the optical fiber 3 (3a, 3b), and between the optical device 33 and the photodiode 31.

As described heretofore, also in the optical transceiver module OM3 of the third embodiment, the optical fiber 3 is inserted in the through hole 7 of the ferrule 1 and secured in a configuration such that the optical fiber 3 protrudes with a specified length toward the mounting surface 9 of the ferrule 1. As described heretofore, also in the optical transceiver module OM3 of the third embodiment, the optical fiber 3 is inserted in the through hole 7 of the ferrule 1 and secured in a configuration such that the optical fiber 3 protrudes with a specified length toward the mounting surface 9 of the ferrule 1. With this structure, the Bragg diffraction grating 13 can be produced easily in the protruding part of the optical fiber 3 on the mounting surface 9 after the optical fiber 3 is secured to the ferrule 1. Consequently, it is possible to prevent the occurrence of a change in the reflective characteristic of the Bragg diffraction grating 13 formed in the optical fiber 3.

In the optical transceiver module OM3 of the third embodiment, the semiconductor optical amplifier 5 and the photodiode 31 are installed on the mounting surface 9 of the ferrule 1. This contributes to downsizing the optical transceiver module OM3.

The optical transceiver module OM3 of the third embodiment also contains a lead frame 37, which supports the ferrule 1 and is electrically connected to optical semiconductor devices including the semiconductor optical amplifier 5 and the photodiode 31. The lead frame 37 allows the optical transceiver module OM3 to be installed on a substrate outside (not indicated in Figures), and also facilitates the electrical connection between the optical semiconductor devices (the semiconductor optical amplifier 5 and the photodiode 31) and the substrate outside.

The optical modules according to the present invention are not limited to the embodiments herein provided, and various other modifications thereof can be made. For example, devices other than the photodiode 21 and 31 can be employed as the optical receiver device that is capable of converting optical signals to electric signals. Likewise, devices other than the semiconductor optical amplifier 5 can be used as the optical transmission device for converting electric signals to optical signals. The optical transmission module OM1 of the first embodiment as well as the optical receiver module OM2 of the second embodiment may incorporate a lead frame 37 and a resin sealing body 41. In the optical transceiver module OM3 of the third embodiment, an optical fiber having a pig tail portion can be employed as the optical fiber 3.

What is claimed is:

1. A method of manufacturing an optical module comprising:

preparing a column-shaped mounting member having a through hole extending in the direction of the central axis thereof and having a mounting surface formed by partially incising a part of said mounting member so as to expose the interior surface of said through hole;

inserting an optical fiber into said through hole and securing the optical fiber such that said optical fiber protrudes with a specified length onto said mounting surface;

forming a Bragg diffraction grating in the protruding part of the optical fiber on the mounting surface after securing the optical fiber; and optically connecting an optical semiconductor device to an end of the optical fiber.

2. The method of claim 1 including mounting the optical semiconductor device on the mounting surface.

3. The method of claim 2 wherein the optical semiconductor device is an active semiconductor device.

4. A method of manufacturing an optical module comprising:

preparing a mounting member having a first section wherein a through hole is formed extending along the central axis thereof, and a second section wherein a groove is formed extending in continuation with, and in the same direction as, said through hole;

inserting an optical fiber into said through hole and securing the optical fiber such that said optical fiber protrudes with a specified length into said groove;

forming a Bragg diffraction grating in the protruding part of the optical fiber on the mounting surface after securing the optical fiber; and optically connecting an optical semiconductor device to an end of the optical fiber.

5. The method of claim 4 including mounting the optical semiconductor device over the groove.

6. The method of claim 5 wherein the optical semiconductor device is an active semiconductor device.

* * * * *